United States Patent [19]

Mason

[11] 4,158,106
[45] Jun. 12, 1979

[54] TELEPHONE HANDSET ACOUSTIC COUPLING CUP
[75] Inventor: Roy G. Mason, Sunnyvale, Calif.
[73] Assignee: Anderson Jacobson, Inc., San Jose, Calif.
[21] Appl. No.: 857,090
[22] Filed: Dec. 5, 1977
[51] Int. Cl.² .......................................... H04M 11/00
[52] U.S. Cl. ..................................................... 179/2 C
[58] Field of Search ................................ 179/1 C, 2 C
[56] References Cited
U.S. PATENT DOCUMENTS

| 3,553,374 | 1/1971 | Wolf et al. | 179/1 C |
| 3,719,783 | 3/1973 | Kennedy | 179/1 C |

*Primary Examiner*—Kathleen H. Claffy
*Assistant Examiner*—Kenneth A. Chayt
*Attorney, Agent, or Firm*—Limbach, Limbach & Sutton

[57] ABSTRACT

A telephone handset acoustic coupling cup adapted for use as part of an acoustic data coupler wherein the cup has a flexible, gripping lip surrounding an opening for receiving a telephone handset transmitter or receiver case. Each of two acoustic coupling cups may additionally be eccentrically rotatably mounted on a case in a manner that their openings may be varied in distance from one another by rotating the cups with respect to the case. The cups may also be flexible in a manner to be bendable with respect to said case, all with the view of providing an acoustic data coupler that can accept a wide variety of different sizes and shapes of telephone handsets.

14 Claims, 10 Drawing Figures

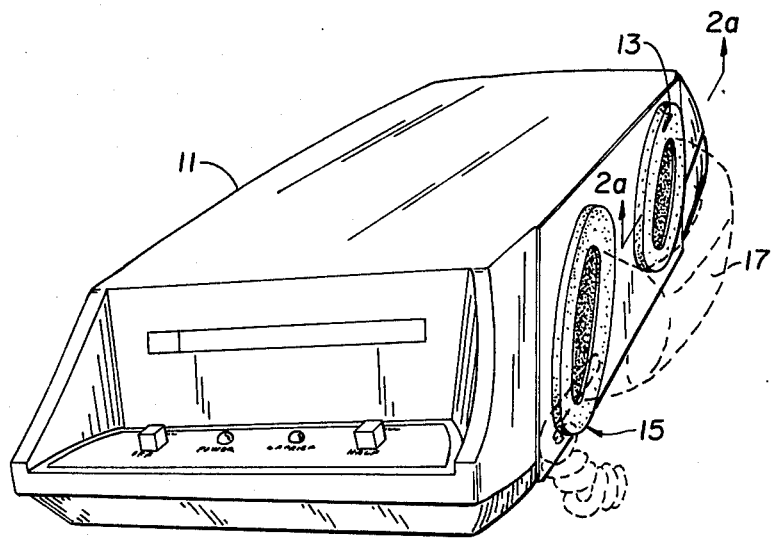
FIG.___1.
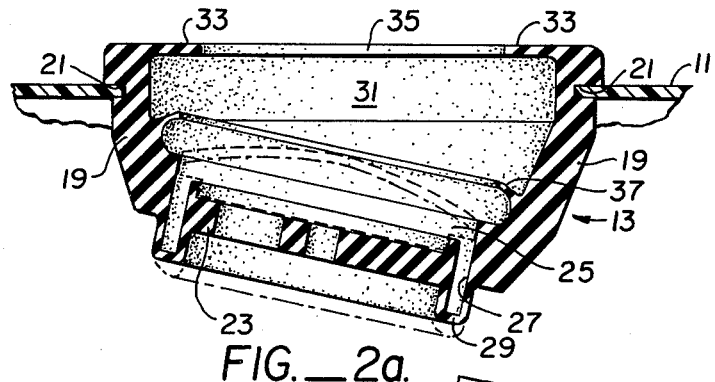
FIG.___2a.
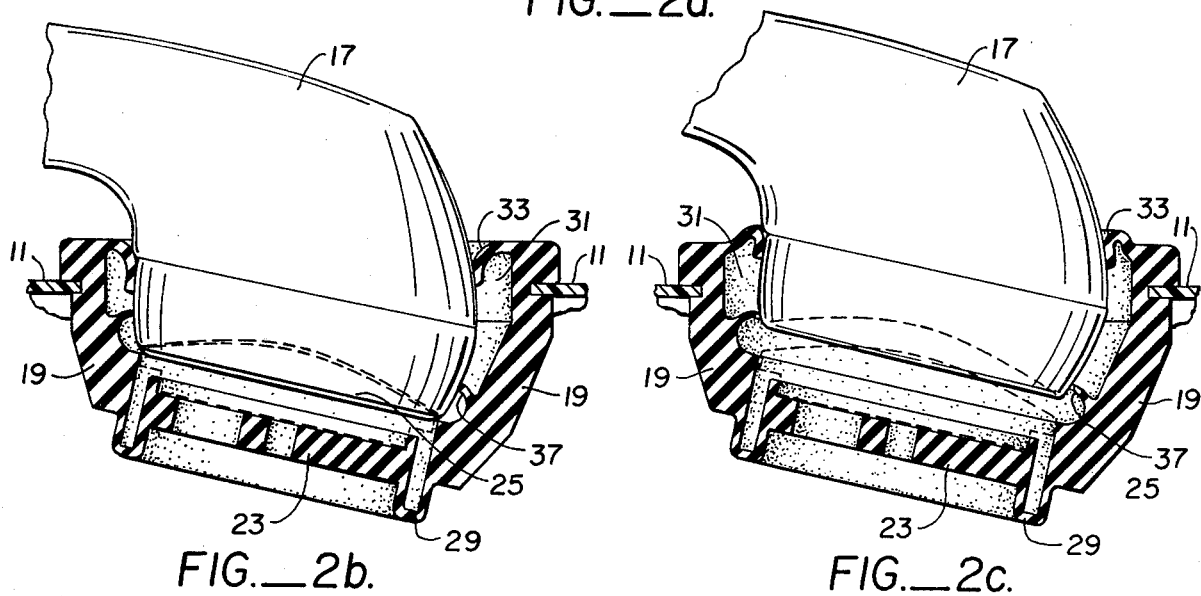
FIG.___2b.
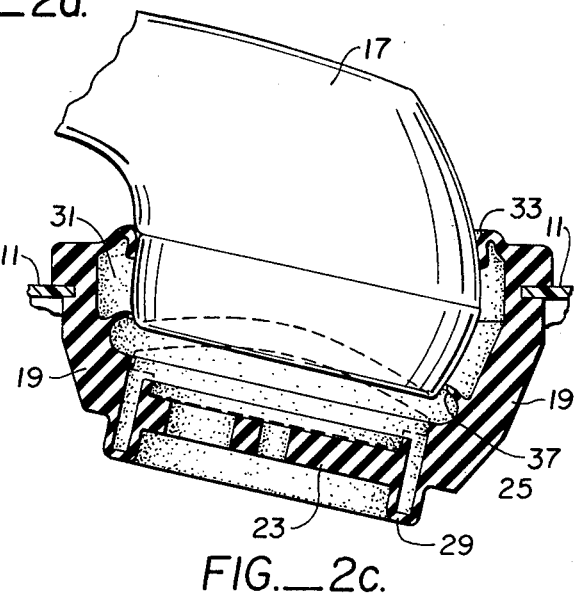
FIG.___2c.

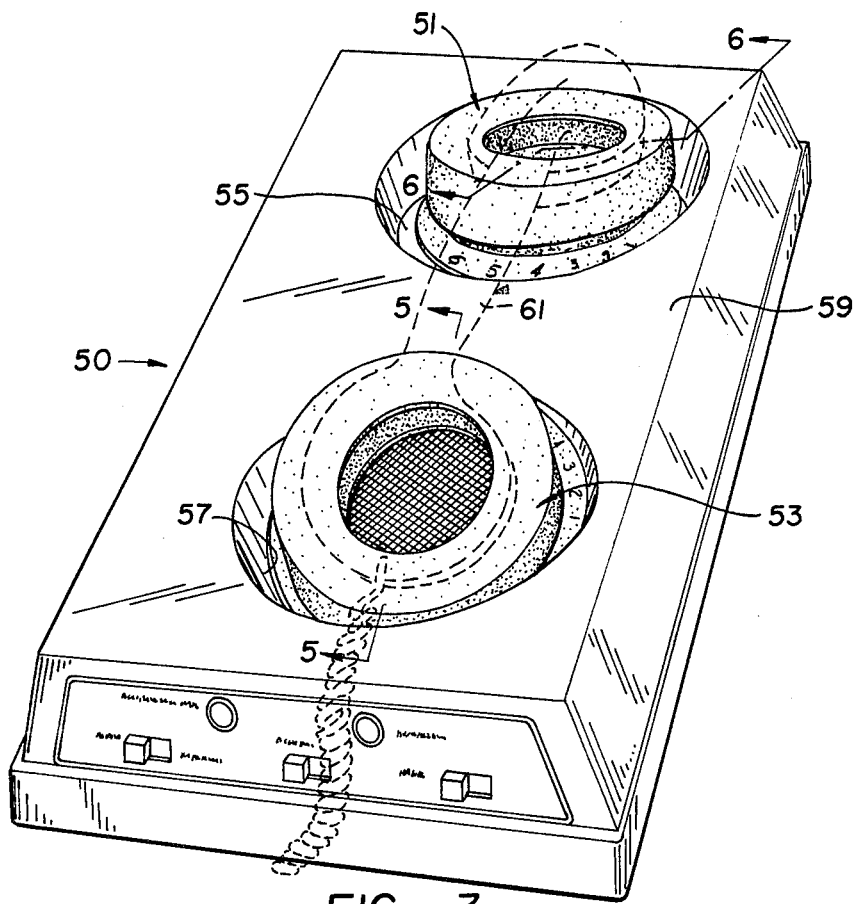
FIG._3.
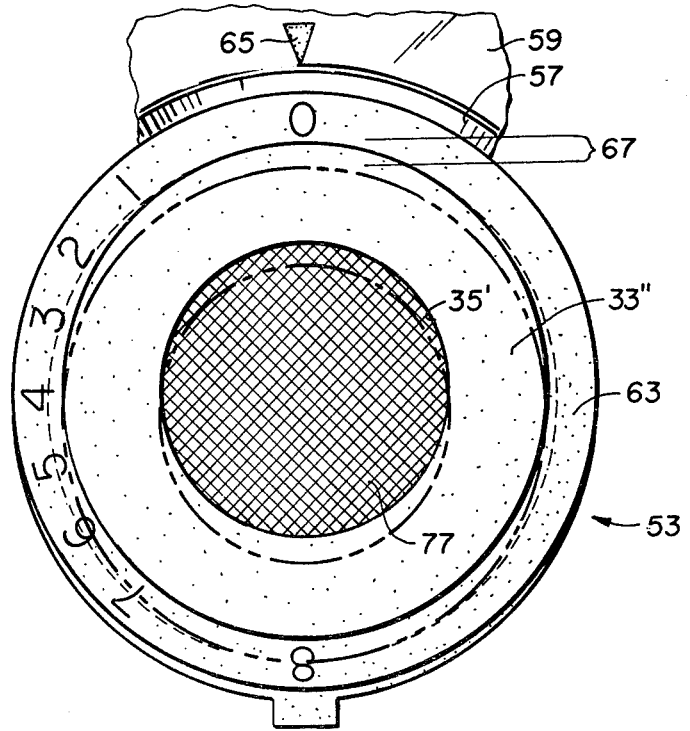
FIG._4.

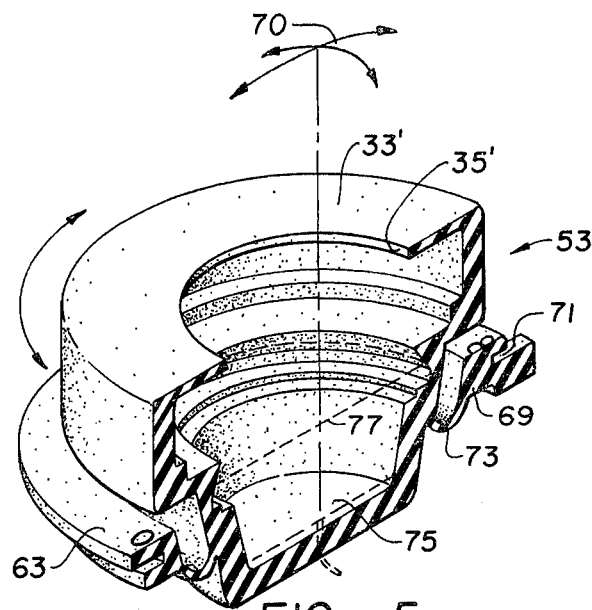
FIG._5.
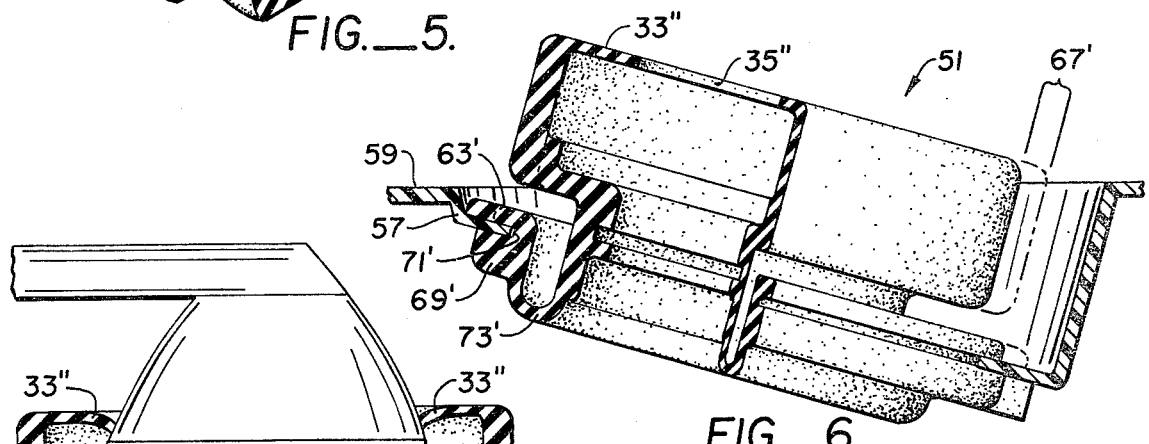
FIG._6.
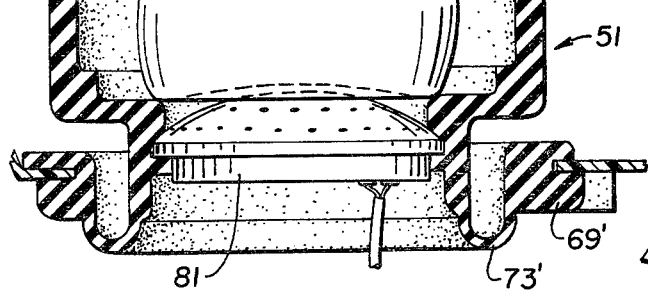
FIG._7a.
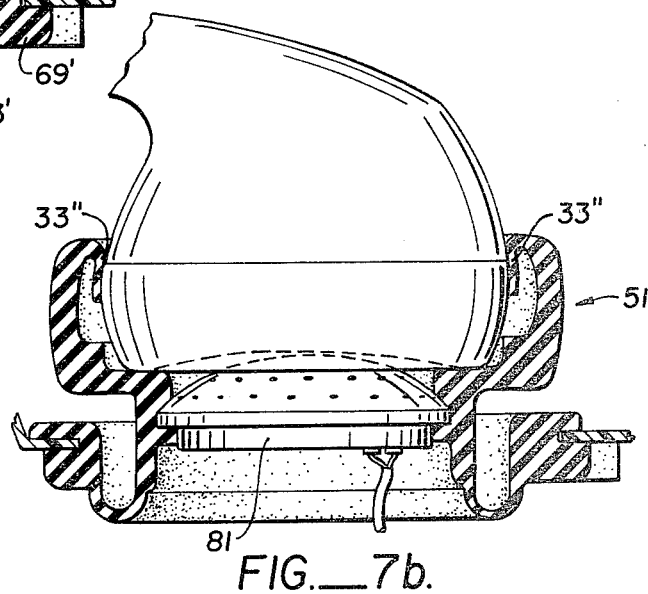
FIG._7b.

TELEPHONE HANDSET ACOUSTIC COUPLING CUP

BACKGROUND OF THE INVENTION

This invention relates generally to acoustic data couplers, and particularly to the design of receiver and transmitter element containing cups thereon for establishing a mechanical and acoustical coupling with telephone handsets of various sizes.

Data couplers are becoming widely used as a means for connecting computer equipment to an ordinary telephone line through a telephone handset. Such a coupler generally contains audio transmitter and receiving elements on its case with the elements being electrically connected therein so that computing equipment can both receive and transmit computer data over an ordinary telephone line. The telephone line is connected to the receiving and transmitting elements by placing a handset of an ordinary telephone in close contact therewith. In order to maintain the contact and also exclude some background noise from interferring with the data transmission, acoustic coupling cups are utilized at each of the transmitter and receiver elements for contacting the handset. Existing couplers of this type are exemplified by the following U.S. patents: U.S. Pat. Nos. 3,553,374—Wolf (1971); 3,585,302—Swan (1971); 3,719,783—Kennedy (1973); 3,725,584—Kilmer et al (1973); 3,733,437—Keith (1973); and 3,992,583—Davis et al (1976).

It is a principal object of the present invention to provide an improved data coupler handset receiving cup that holds a handset in place on the data coupler with improved mechanical security, accepts a wider variation and sizes of handsets and which provides a close contact between the receiving and transmitting elements of the acoustic coupler and the handset being carried thereby.

SUMMARY OF THE INVENTION

These and additional objects are accomplished by the various aspects of the present invention, wherein, briefly, according to one aspect, a thin flexible resilient rubber-like lip is held by a cup structure and extends inward therefrom to form a circular opening. The lip has a free space beneath it within the cup so that when a handset piece having a diameter larger than the opening is pushed therethrough the lip opening attaches to the handset and stretches. As the handset is pushed into the opening the lip curls downward. This securely holds the handset in place and when it is attempted to pull it out of the cup there is a resilient holding force established by the curled lip. This tightness permits mounting of the handset on the side or bottom of a device without any further attachment device or clip being necessary. The tightness of the lip around the handset also provides an improved acoustic isolation of a receiver or transmitter element within from the surrounding background noise outside of the cup.

According to another aspect of the present invention, a receiver or transmitter element carried with a cup is mounted on a bottom portion that is resiliently urged upward to provide a close contact with a receiver or transmitter end of a telephone handset that may be placed into the cup. This is provided, in a preferred form, by supporting the bottom cup portion through a resilient lip of thin, flexible rubber-like material. This permits a simplified, unitary construction of the cup.

According to another aspect of the present invention, the cup is rotatably mounted on the housing in a manner that its axis of rotation is displaced from the center of the opening which receives the handset. The result is that the distance between openings can be varied by rotating one or both of the acoustical cups, thereby accepting different length handsets with the single acoustical coupler.

According to another aspect of the present invention, the portion of the cup that receives and contacts the handset is mounted to a base portion attached to the case through a resilient lip in a manner to permit tilting of the handset receiving cup portion with respect to the base portion of the cup. This feature provides an adjustment for handsets having different angular relationships and dimensions.

Each of the various aspects of the present invention summarized above may be combined into a single cup structure or provided as individual improvements in existing cup designs. Additional objects, advantages and features of the various aspects of the present invention will become apparent from the following detailed description of their preferred embodiments.

BRIEF DESCRIPTION OF THE DRAWINGS

FIG. 1 illustrates an acoustic data coupler having coupling cups according to one particular design;

FIGS. 2a, 2b and 2c are sectional views of one of the cups of the acoustic data coupler at FIG. 1 taken at section 2a—2a thereof;

FIG. 3 illustrates another acoustic data coupler having coupling cups according to another particular design;

FIG. 4 is a top view of one of the coupling cups of FIG. 3;

FIG. 5 is a cross-sectional view of one of the coupling cups of the coupler of FIG. 3 taken across section 5—5 thereof;

FIG. 6 is a partially cut away and sectional view of the other coupling cup of the coupler of FIG. 3 taken across section 6—6 thereof; and FIGS. 7a and 7b show in further sectional view the acoustical cup of FIG. 6 with handsets of widely varying sizes held thereby.

DESCRIPTION OF THE PREFERRED EMBODIMENT

Referring to FIG. 1, an acoustic data coupler instrument 11 contains on one side surface thereof a receiver coupling cup 13 and a transmitter coupling cup 15 spaced apart in a manner to receive an ordinary telephone handset 17 illustrated in dotted outline. The side of the data coupler 11 on which the coupling cups 13 and 15 are installed is substantially vertical.

Referring to FIG. 2a, the cup 13 is described. The cup 13 is a single unitary element molded from a rubber-like plastic material. A wall portion 19 is generally circular and is made thick enough to be fairly rigid and stay in substantially one place with respect to the case 11 to which it attaches in a circular groove 21 extending around the outside of the cup 13 and its wall 19. The wall portion 19 is angularly shaped so that the cups can be installed on a flat surface. This is made possible by the wall portion 19 holding the transducer at an angle with respect to the cover 11.

A circular base 23 of the cup 19 carries a generally circular receiving transducer element 25, shown in dotted outline in FIGS 2a, 2b and 2c. The base portion 23 is made of thick material and thus is relatively stiff. The circular base 23 is permitted some degree of movement within a circular opening 27 provided at the bottom of the walled portion 19. The base portion 23 is connected to the walled portion 19 by a thinner molded resilient fold 29 that bridges the gap between the elements 23 and 19. As is shown in dotted outline in FIG. 2a, the base portion 23 is thus permitted to be pushed downward with respect to the side portions 19. This occurs when a telephone handset element of sufficient size is placed into a central cavity 31 of the cup 13. This assures a close physical contact and improved acoustical coupling between the handset and the element 25 since the fold 29 resiliently urges the element 25 upwards against the handset.

At the top of the generally circular side wall portion 19 and extending inward thereof is a thin, flexible circular lip 33 extending part way across the open cavity 31 to form a circular opening 35 therethrough. The diameter of the circular opening 35 is chosen to be smaller than the outside diameter of the telephone handset portion designed to be fit thereinto.

Referring to FIG. 2b, the operation of the lip 33 is illustrated when a receiving end of the handset 17 is placed through the opening 35 into the cavity 31. The circular edge of the lip 33 forming the opening 35 stretches radially outward as the handset is pushed therethrough, forms a tight frictional engagement with the handset and rolls downward into the cavity 31 as the handset 17 is pushed further thereinto, as shown in FIG. 2b. The depth of the cavity 31 is made sufficient, and the diameter of the opening 35 cooperatively sized, all relative to the diameter of the end of the handset 17, so that the lip so rolls downward as shown in FIG. 2b when the handset is inserted.

The advantages of the lip 33 are shown with reference to FIG. 2c where the handset 17 is shown to be partially withdrawn from the cavity 31. The elastic gripping force of the lip 33 still holds when the handset 17 is partially withdrawn as shown in FIG. 2c. Because of the roll of the lip 33, as there shown, the force of the lip 33 tends to pull the handset 17 backward into the cavity 31. Only when sufficient force is applied to the handset 17 to withdraw it even further from the cavity 31 does this positive engagement with the lip 33 break. This has the advantage that the handset 17 is held firmly in place, thus making it possible to place it on the side of an instrument as shown in FIG. 1 or even on the bottom of an instrument if desired. It has the further advantage of firmly holding the handset 17 into the cup 13 in close contact with the receiving element 25 of the acoustic data coupler 11.

Referring to all of FIGS. 2a, 2b and 2c, a thin, flexible flange 37 is provided on the inside of the walls 19 extending into the cavity 31 a short distance to form yet another circular opening through which a handset, such as the handset 17, may tightly fit as best shown in FIG. 2b. This second flange provides an additional amount of acoustic isolation of the coupling between the receiver 25 and the handset 17 from external noise surrounding the data coupler 11.

The receiving cup 13 has been described. The transmitter cup 15 is preferably of essentially the same design. As an alternative to this, it will be understood that only one of the cups 13 and 15 need have structure described with respect to FIGS. 2a, 2b and 2c for some applications. The other cup could be of a conventional existing design.

Referring to FIG. 3, another data coupler 50 contains a receiver coupling cup 51 and a transmitter cup 53. These cups are mounted on housing surfaces 55 and 57, respectively, which are angularly displaced with respect to a flat top housing surface 59. A handset 61, shown in dotted outline, is positioned in both of the cups 51 and 53.

In order to accommodate a widely varying set of telephone handset sizes and shapes, the cups 51 and 53 are provided with additional adjustments that the cups described above with respect to FIGS. 1 and 2 do not contain. Referring to FIG. 4, one of these additional adjustment features is illustrated by a top view of the cup 53, although the same can be said for the cup 51. The cup 53 has a flange 63 upon which are formed numbers around its circumference. An arrow 65 is attached to the flat surface 59 of the acoustic data coupler 51. The cup 53 is attached to the coupler 51 in a manner that a telephone handset receiving opening 35' and a lip 33' moves laterally with respect to the other acoustic cup 51 when the acoustic cup 53 is rotated. The arrow 65 and the numbers on the cup flange 63 provide an indication of its rotatable position and thus also of the lateral position of the opening 35'. The range of lateral positions is shown in FIG. 4 in dotted outline, having a maximum lateral displacement indicated by the distance 67 of FIG. 4.

The particular structure of the receiver acoustical cup 53 can be observed from the sectional view of FIG. 5, wherein components and elements thereof having the same structure, function and operation as other elements of embodiments described earlier are given the same reference number with a prime (') or double prime (") added thereto in order that a repeated description of their operation can be avoided. All of the shapes and elements of the cup 51 shown in FIG. 5 and to be described are made from a single continuous molded element.

A base flange 69, carrying the rotational numbers on its top surface 63', is attached in a circular slot 71 to the portion 57 of the data coupler 51. The rest of the cup 51 is attached thereto by a resilient lip 73 made of thinner material than is the base portion 69 or most of the remaining portions of the cup 51, as is quite apparent from the sectional view of FIG. 5. The curved nature of the lip 73 allows it to be stretched straight in some areas while at the same time to be given a higher degree of curvature in other areas. This capability thus makes it possible to tilt the top part of the cup 51 with respect to the base 69 and thus with respect to the cover of the acoustic coupler 51. Arrows 70 indicate this motion. This provides additional flexibility in receiving telephone handsets of various sizes.

Although not shown in FIG. 5, a transmitter element is positioned within the cup 51 at a lower depression 75. It is covered by a screen 77 shown in dotted outline in FIG. 5.

Referring to FIG. 6, the receiver cup 51 is shown. It is constructed generally the same as the transmitting cup 53, so similar components thereof are given the same reference numbers with a prime (') added. The lip 33" and opening 35" cooperate with a telephone handset in the same manner as the elements 33 and 35 as previously explained with respect to FIGS. 1 and 2. The slot 71' and the base 69' of the cup 53 is made eccentric to the opening 35". This is, the center of the circular slot 71' is displaced a lateral distance with respect to the center of the circular opening 35". The centers are displaced a lateral distance in a direction toward or away from the centers of the other acoustical cup 53, thereby converting rotary motion of the cup 53 into axial displacement of its opening 35' in a lateral direction toward or away from the other acoustical cup 51.

Referring to FIGS. 7a and 7b, the receiving cup 51 is shown with a receiving transducer element 81 therein. Also illustrated are the extreme dimensions of a receiver end of a telephone handset that can be utilized with the particular lip structure that has been described herein. The cup embodiment of FIGS. 3-7 is preferable for use in European countries where the handsets vary considerably in size. The acoustic cup illustrated with respect to FIGS. 1 and 2 is less flexible in the variation of handset sizes that it can handle but is satisfactory for markets in the United States and Canada.

It will be recognized that the various features described herein with respect to its preferred embodiments can be combined in other ways than those particular examples shown and described herein. For example, only one of a pair of acoustical cups need have the telephone handset gripping lip feature described initially with respect to FIGS. 1 and 2. As another example, the rotatable and bendable acoustical cup described with respect to FIGS. 3-7 may be used as only one of the acoustical cups with some other type being used as the other in a given acoustical data coupler. Therefore, even though the various aspects of the present invention have been described with respect to its preferred embodiments, it will be understood that the invention is entitled to protection within the full scope of the appended claims.

I claim:

1. In an acoustic data coupler having a case and two acoustic coupling cups held by said case and spaced apart for accepting receiver and transmitter portions of a telephone handset, one of said cups containing a telephone receiving transducer and the other of said cups a telephone transmitter transducer, at least one of said cups comprising:

a thin flexible lip extending inward of a more rigid circular support extending upward from the case, said lip terminating in a circular opening having a given diameter, the mechanical characteristics of the lip being such that when a telephone handset receiver or transmitter having a diameter larger than said given diameter is forced inward through the cup opening the internal circular edge of said lip stretches outwardly firmly gripping the handset transmitter or receiver and moves inward therewith from the lip as the receiver or transmitter is urged inward to a rest position, thereby causing a roll in said lip which provides a force tending to pull the telephone handset into said cup and against said telephone transducer, whereby good quality acoustical coupling is provided between the handset receiver or transmitter and the cup transducer.

2. The acoustic data coupler according to claim 1 wherein said at least one of said cups carries its said receiver or transmitter transducer on a circular bottom portion that is connected to said circular support through a resilient fold that tends to push said bottom inward of said cup in a direction toward said lip, thereby assuring an intimate contact between said transducer and said telephone handset.

3. In an acoustic data coupler having a case and two acoustic coupling cups held by said case and spaced apart for accepting receiver and transmitter portions of a telephone handset, one of said cups containing a telephone receiving transducer and the other of said cups a telephone transmitter transducer, at least one of said cups comprising:

a thin flexible lip extending inward of a more rigid circular support extending upward from the case, said lip terminating in a circular opening having a given diameter, the mechanical characteristics of the lip being such that when a telephone handset receiver or transmitter having a diameter larger than said given diameter is forced inward through the cup opening the internal circular edge of said lip stretches outwardly firmly gripping the handset transmitter or receiver and moves inward therewith from the lip as the receiver or transmitter is urged inward to a rest position, said transmitter or receiver transducer being mounted on a bottom of said at least one of said cups and a thin flexible annular flange extending inward of said circular support beneath said lip but above said transducer, said flange having a circular opening slightly greater than said given diameter, thereby to provide a second acoustic seal between a telephone handset and said transducer within said cup.

4. The acoustic data coupler according to claim 1 wherein said at least one of said cups comprises a base portion that is carried by said data coupler case and an upwardly telescoping portion containing said circular support and lip, the receiver or transmitter transducer being carried by said upwardly telescoping portion, said telescoping cup portion being held within the base portion and attached thereto at a bottom thereof in a manner that said telescoping portion is bendable with respect to said base portion.

5. The acoustic data coupler according to claim 4 wherein said telescoping portion of said at least one of said cups is connected to the base portion of the cup by a thin resilient bendable lip formed in a loop between telescoping and base portions of the cup.

6. In an acoustical data coupler having a case and two acoustic coupling cups held by said case and spaced apart for accepting receiver and transmitter portions of a telephone handset, one of said cups containing a telephone receiving transducer and the other of said cups a telephone transmitter transducer, at least one of said cups comprising:

a thin flexible lip extending inward of a more rigid circular support extending upward from the case, said lip terminating in a circular opening having a given diameter, the mechanical characteristics of the lip being such that when a telephone handset receiver or transmitter having a diameter larger than said given diameter is forced inward through the cup opening the internal circular edge of said lip stretches outwardly firmly gripping the handset transmitter or receiver and moves inward therewith from the lip as the receiver or transmitter is urged inward to a rest position, said at least one of said cups being eccentrically rotatably mounted on said case in a manner that when rotated its said opening moves laterally a distance with respect to the other of said cups, thereby providing an adjustment for telephone handsets having different dimensions between their said transmitter and receiver case elements.

7. The acoustic data coupler according to claim 6 wherein said at least one of said cups or a portion of the case therearound contains numerical markings and the other of said at least one of said cups or a portion of the case therearound contains a pointer, whereby the rotational position and thus the eccentricity of the telephone handset opening can be quantitatively set.

8. In an acoustical data coupler having a case and two spaced apart acoustic coupling cups carried by said case, each cup comprising:
   a base portion rotatably held by said case,
   a circular shell extending upward from said base, and
   a thin flexible lip extending inward of said shell and leaving a circular opening therein for receiving a telephone handset portion,
   said base being mounted to said case in a manner to rotate about an axis that is physically displaced from the center of said circular opening, thereby to move the position of said circular opening with respect to said base as said cup is rotated.

9. An acoustic data coupler according to claim 8 wherein said upward shell of at least one acoustic cup is connected to said base through a circular resilient lip, whereby said upward portion may be bent with respect to said base to accommodate different handset sizes.

10. An acoustic data coupler according to claim 8 wherein said at least one resilient cup or the area of said case immediately adjacent thereto carries numbers and the other of said at least one resilient cup or the area of said case immediately adjacent thereto carries an indicator, whereby the rotatable position thereof may be determined.

11. For an acoustical data coupler having a case and two spaced-apart acoustic cups carried by said case, at least one of said acoustic cups being formed of a unitary molded structure, comprising:
   a base portion adapted to be held by said case and having a circular opening therein,
   means adapted to freely move within said base portion for carrying a telephone transducer, and
   a thin, flexible resilient fold joining said transducer carrying means with the bottom of said base portion in a manner to resiliently urge said transducer carrying means upward within said base.

12. The acoustic data coupler cup according to claim 11 which additionally comprises a thin flexible lip formed as part of said base portion and extending inward of a top opening of said base portion to form a circular opening, thereby to tightly receive a telephone handset receiver or transmitter therein that is larger in diameter than the diameter of said circular opening, whereby said lip and said fold urge the telephone handset and the transducer together.

13. The acoustic data coupler cup according to claim 12 wherein said thin flexible lip is additionally characterized by stretching as a telephone handset receiver or transmitter of larger diameter than its said circular opening is forced therethrough, thereby to firmly grip the handset and forming a roll therearound that pulls the handset into said base portion.

14. For an acoustical data coupler having a case and two spaced-apart acoustic cups carried by said case, at least one of said acoustic cups being formed of a unitary molded structure, comprising:
   a base portion adapted to be held by said case and having a circular opening therein,
   an upwardly telescoping cup portion held within the circular opening of the base and adapted to receive a telephone handset receiver or transmitter and containing a telephone transducer therein, and
   a thin, flexible resilient fold joining said base and said telescoping cup portions at their lower extremities, thereby permitting said telescoping cup portion to bend with respect to said base portion.

* * * * *